United States Patent
Li et al.

(10) Patent No.: US 12,196,929 B2
(45) Date of Patent: Jan. 14, 2025

(54) ADD-ON ANAMORPHIC LENS

(71) Applicants: GUANGDONG SIRUI OPTICAL CO., LTD., Zhongshan (CN); Zhongshan AZU Optoelectronics Technology Co., Ltd., Zhongshan (CN)

(72) Inventors: Jie Li, Zhongshan (CN); Wei Wu, Zhongshan (CN)

(73) Assignees: GUANGDONG SIRUI OPTICAL CO., LTD., Zhongshan (CN); Zhongshan AZU Optoelectronics technology Co., Ltd., Zhongshan (CN)

( * ) Notice: Subject to any disclaimer, the term of this patent is extended or adjusted under 35 U.S.C. 154(b) by 175 days.

(21) Appl. No.: 17/943,247

(22) Filed: Sep. 13, 2022

(65) Prior Publication Data

US 2024/0036296 A1  Feb. 1, 2024

(30) Foreign Application Priority Data

Jul. 27, 2022 (CN) .......................... 202210896204.2
Jul. 27, 2022 (CN) .......................... 202221963648.5

(51) Int. Cl.
G02B 13/08 (2006.01)

(52) U.S. Cl.
CPC .................................. *G02B 13/08* (2013.01)

(58) Field of Classification Search
None
See application file for complete search history.

(56) References Cited

U.S. PATENT DOCUMENTS

| 2,752,821 | A | * | 7/1956 | Cook | G02B 13/08 |
| | | | | | 359/744 |
| 5,668,666 | A | * | 9/1997 | Suzuki | G02B 13/12 |
| | | | | | 359/674 |
| 6,995,920 | B2 | * | 2/2006 | Nurishi | G02B 13/08 |
| | | | | | 359/675 |
| 7,289,272 | B2 | * | 10/2007 | Bowron | G02B 13/12 |
| | | | | | 359/674 |
| 8,174,773 | B2 | * | 5/2012 | Pretorius | G02B 13/08 |
| | | | | | 359/656 |
| 10,078,201 | B2 | * | 9/2018 | Neil | G02B 3/06 |
| 10,126,533 | B1 | * | 11/2018 | Caldwell | G02B 9/64 |
| 11,287,618 | B2 | * | 3/2022 | Neil | H04N 23/55 |

* cited by examiner

*Primary Examiner* — Darryl J Collins
(74) *Attorney, Agent, or Firm* — Loeb & Loeb LLP (57) ABSTRACT

Aspects of the invention disclose an external and an add-on anamorphic lens, which comprises a focus group and an anamorphic group disposed in sequence from an object side to an image side along the optical axis. The focus group comprises a first lens and a second lens. The first lens and the second lens are spherical lenses. The anamorphic group includes a third lens, a fourth lens, and a fifth lens. These lenses are cylindrical lenses. The position of the first lens is adjustable and therefore solve the problem of requiring secondary focusing of the prior art.

8 Claims, 7 Drawing Sheets

ADD-ON ANAMORPHIC LENS

TECHNICAL FIELD

The present invention generally relates to the technical field of lenses, in particular to a kind of add-on anamorphic lens.

BACKGROUND

With the popularity of consumer-grade widescreen anamorphic lenses, more and more amateur or professional users use lightweight and compact anamorphic cinematic lenses for video, commercial and every day shooting. High-magnification anamorphic cinema lenses have a stronger cinematic feel, but they are difficult for ordinary users to achieve due to their high price and weight. The highly cost-effective low-magnification cine lens on the market can achieve 2.0× magnification of professional widescreen cinematic lens by means of an add-on lens. During the shooting process of the existing SLR anamorphic add-on lens, the main lens and the anamorphic lens are required for focusing separately, and the use experience and effect are very poor.

SUMMARY

Therefore, the technical problem to be solved by the present invention is to overcome deficiencies that the existing add-on anamorphic lens needs to receive secondary focus when in use, which affects the use experience, so as to provide an add-on anamorphic lens.

For solving the above-mentioned technical problems, the technical scheme of the present utility model is as follows:

An external anamorphic lens may include a focus group and an anamorphic group disposed in sequence from an object side to an image side along an optical axis. In one embodiment, the focus group comprises a first lens and a second lens, wherein the first lens and the second lens comprise spherical lenses. In another embodiment, the anamorphic group comprises a third lens, a fourth lens, and a fifth lens, wherein the third lens, the fourth lens, and the fifth lens comprise cylindrical lenses. In a further embodiment, a position of the first lens is adjustable along the optical axis.

In yet a further embodiment, aspects of the invention may further including a magnification of 1.25 times and adapted to be used with another anamorphic lens with a magnification of 1.60 times.

In yet another embodiment, aspects of the invention may include a degree distribution of an Abbe number of lenses of the focus group and lenses of the anamorphic group is configured to satisfy the following relationship:

$abs(fy_{(1-2)}) > 20000;$ $-1.05 < fy_{(1)}/fy_{(2)} < -0.95;$ $abs(fy_{(3-5)}) > 20000;$ $-1.00 < fy_3/fy_{(4-5)} < -0.60;$ wherein, the $abs(fy_{(1-2)})$ represents a combined Abbe number for the first lens and the second lens along an Y-axis; wherein the $abs(fy_{(3-5)})$ represents a combined Abbe number for the third lens to the five lens along the Y-axis; wherein the $fy_{(1)}$ comprises a focal length of the first lens along the Y-axis; wherein the $fy_{(2)}$ comprises a focal length of the second lens along the Y-axis; wherein the $fy_{(3)}$ comprises a focal length of the third lens along the Y-axis; wherein the $fy_{(4-5)}$ comprises a combined focal length of the fourth lens and the fifth lens along the Y-axis.

In one aspect, a length of the add-on anamorphic lens is less than 70 mm.

In one embodiment, an add-on matching filter may be fitted to the add-on anamorphic lens and the filter may comprise a characteristic of φ82 mm.

In one aspect, wherein the fourth lens and the fifth lens are attached, glued or gelled together.

The technical aspects of the invention may include the following advantages:

The add-on anamorphic lens provided by the aspects of the invention comprises a focus group and an anamorphic group arranged in sequence from the object side to the image side, the focus group includes two spherical lenses, and the anamorphic group includes three cylindrical lenses. This technical solution cleverly uses spherical focus group to solve the major defect of traditional additional or add-on anamorphic lens requiring secondary focusing when the anamorphic lens is used. At the same time, through the integrated design of focus group and anamorphic group, only by moving or adjusting the first lens, it may independently complete from close range to infinity without requiring the main lens to be involved with the focusing. This reduces steps in adjusting when taking photographs, making operating the add-on anamorphic lens more convenient.

BRIEF DESCRIPTION OF DRAWINGS

In order to more clearly illustrate the specific embodiments of the present application or the technical solutions in the prior art, the accompanying drawings that need to be used in the description of the specific embodiments or the prior art will be briefly introduced below. The drawings are some embodiments of the present application. For those of ordinary skilled in the art, other drawings can also be obtained from these drawings without any creative effort.

Description of reference numerals: 1. first lens; 2. second lens; 3. third lens; 4. fourth lens; 5. fifth lens; 6. focus group; 7. anamorphic group; 8. anamorphic lens.

DETAILED DESCRIPTION

The technical solutions of the present application may be clearly and completely described below with reference to the accompanying drawings. Obviously, the described embodiments are part of the embodiments of the present invention, but not all of the embodiments. Based on the embodiments in the present application, all other embodiments obtained by those of ordinary skilled in the art without creative efforts shall fall within the protection scope of the present application.

In the description of this application, it should be noted that the terms "center", "upper", "lower", "left", "right", "vertical", "horizontal", "inner", "outer", etc., where indicated orientation or positional relationship is based on the orientation or positional relationship shown in the accompanying drawings, which is only for the convenience of describing the present application and simplifying the description, rather than indicating or implying that the indicated device or element must have a specific orientation or a specific orientation, construction or operation, and therefore should not be construed as limitations on this application. Furthermore, the terms "first", "second", and "third" are used for descriptive purposes only and should not be construed to indicate or imply relative importance.

In the description of this application, it should be noted that, unless otherwise expressly specified and limited, the terms "installed", "engaged with" and "connected to" should be understood in a broad sense, for example, it may be a fixed connection or a detachable connection, or connection in one piece or an integral way. In another example, it may be a mechanical connection or an electrical connection; it may be a direct connection or an indirect connection through an intermediate medium, and it may be an internal communication of two elements. For those of ordinary skilled in the art, the specific meanings of the above terms in this application may be understood in specific situations.

In addition, the technical features involved in the different embodiments of the present invention described below may be combined with each other as long as there is no conflict with each other.

Referring to FIGS. 1-4, an add-on anamorphic lens may include a focus group 6 and an anamorphic group 7 disposed in sequence from an object side to an image side along an optical axis. In one aspect, the focus group 6 comprises a first lens 1 and a second lens 2 from the object side to the image side, wherein the first lens and the second lens comprise spherical lenses. In another embodiment, the anamorphic group 7 comprises, from the object side to the image side, a third lens 3, a fourth lens 4, and a fifth lens 5, wherein the third lens 3, the fourth lens 4, and the fifth lens 5 comprise cylindrical lenses. In yet another embodiment, a position of the first lens is adjustable along the optical axis.

In one aspect, the add-on anamorphic lens cleverly applies spherical focus group to solve the major defect of traditional additional or add-on anamorphic lens requiring secondary focusing when the anamorphic lens is used. At the same time, through the integrated design of the focus group 6 and the anamorphic group 7, only by moving or adjusting the first lens 1, it may independently complete from close range to infinity without requiring the main lens to be involved with the focusing. This reduces steps in adjusting when taking photographs, making operating the add-on anamorphic lens more convenient.

In one implementation of embodiments of the invention, the second lens 2 of the focus group 6 and the three lenses of the anamorphic group 7 may be fixedly mounted on the first barrel, and the first lens 1 of the focus group 6 is separately mounted on the second lens On the barrel, the first barrel and the second barrel slide along the optical axis direction of the add-on anamorphic lens for telescopic fit or screw fit, and by adjusting the relative position between the second barrel and the first barrel, the first barrel can be realized. The position of the lens 1 in the direction of the optical axis is adjustable. Of course, the method of adjusting the position of the first lens 1 is not limited to the above forms, and any solution that can realize the position adjustment of the first lens 1 in the direction of the optical axis is within the protection scope of the present application.

According to one embodiment, the second lens 2 of the focus group 6 and the three lenses of the anamorphic group 7 may be securely or attachably mounted on a first barrel or part of a housing (not shown), and the first lens 1 of the focus group 6 is separately mounted on a second barrel or part of the housing. In one aspect, the first barrel and the second barrel may slide along an optical axis direction of the add-on anamorphic lens for a telescopic fit or screw fit. Such configuration may enable adjustments a relative position between the second barrel and the first barrel, just realizing an adjustment of positions of the first lens 1 in the direction of the optical axis. Of course, the method of adjusting the position of the first lens 1 is not limited to the above forms, and any solution that may realize the position adjustment of the first lens 1 in the direction of the optical axis is within the protection scope of the present application.

Based on each lens's parameters, which may not be limiting, the following table may include a degree distribution of an Abbe number of lenses of the focus group and lenses of the anamorphic group is configured to satisfy the following relationship:

$$\mathrm{abs}(fy_{(1-2)}) > 20000;$$

$$-1.05 < fy_{(1)}/fy_{(2)} < -0.95;$$

$$\mathrm{abs}(fy_{(3-5)}) > 20000;$$

$$-1.00 < fy_{(3)}/fy_{(4-5)} < -0.60;$$

In particular, the $\mathrm{abs}(fy_{(1-2)})$ represents a combined Abbe number for the first lens and the second lens along an Y-axis; wherein the $\mathrm{abs}(fy_{(3-5)})$ represents a combined Abbe number for the third lens to the five lens along the Y-axis; wherein the $fy_{(1)}$ comprises a focal length of the first lens along the Y-axis; wherein the $fy_{(2)}$ comprises a focal length of the second lens along the Y-axis; wherein the $fy_{(3)}$ comprises a focal length of the third lens along the Y-axis; wherein the $fy_{(4-5)}$ comprises a combined focal length of the fourth lens and the fifth lens along the Y-axis.

The following table provides a set of parameters of each lens of embodiments in accordance with the above mathematical relationship are listed below:

| Lens | Shape | X diameter (mm) | Y diameter (mm) | Thickness (mm) | Refractory value | Abbe number |
|---|---|---|---|---|---|---|
| First lens | spherical | −581.930 | −581.930 | 2.030 | 1.754 | 44.2 |
|  | spherical | 93.280 | 93.280 | 1.400 |  |  |

-continued

| Lens | Shape | X diameter (mm) | Y diameter (mm) | Thickness (mm) | Refractory value | Abbe number |
|---|---|---|---|---|---|---|
| Second lens | spherical | 98.200 | 98.200 | 8.700 | 1.805 | 46.6 |
|  | spherical | −745.300 | −745.300 | 5.700 |  |  |
| Third lens | cylindrical | inf | −78.370 | 2.420 | 1.808 | 45.9 |
|  | cylindrical | inf | 74.740 | 5.510 |  |  |
| Fourth lens | cylindrical | inf | 415.600 | 2.320 | 1.663 | 27.1 |
| Fifth lens | cylindrical | inf | 51.800 | 13.400 | 1.911 | 35.3 |
|  | cylindrical | inf | −82.110 |  |  |  |

Figure 1:
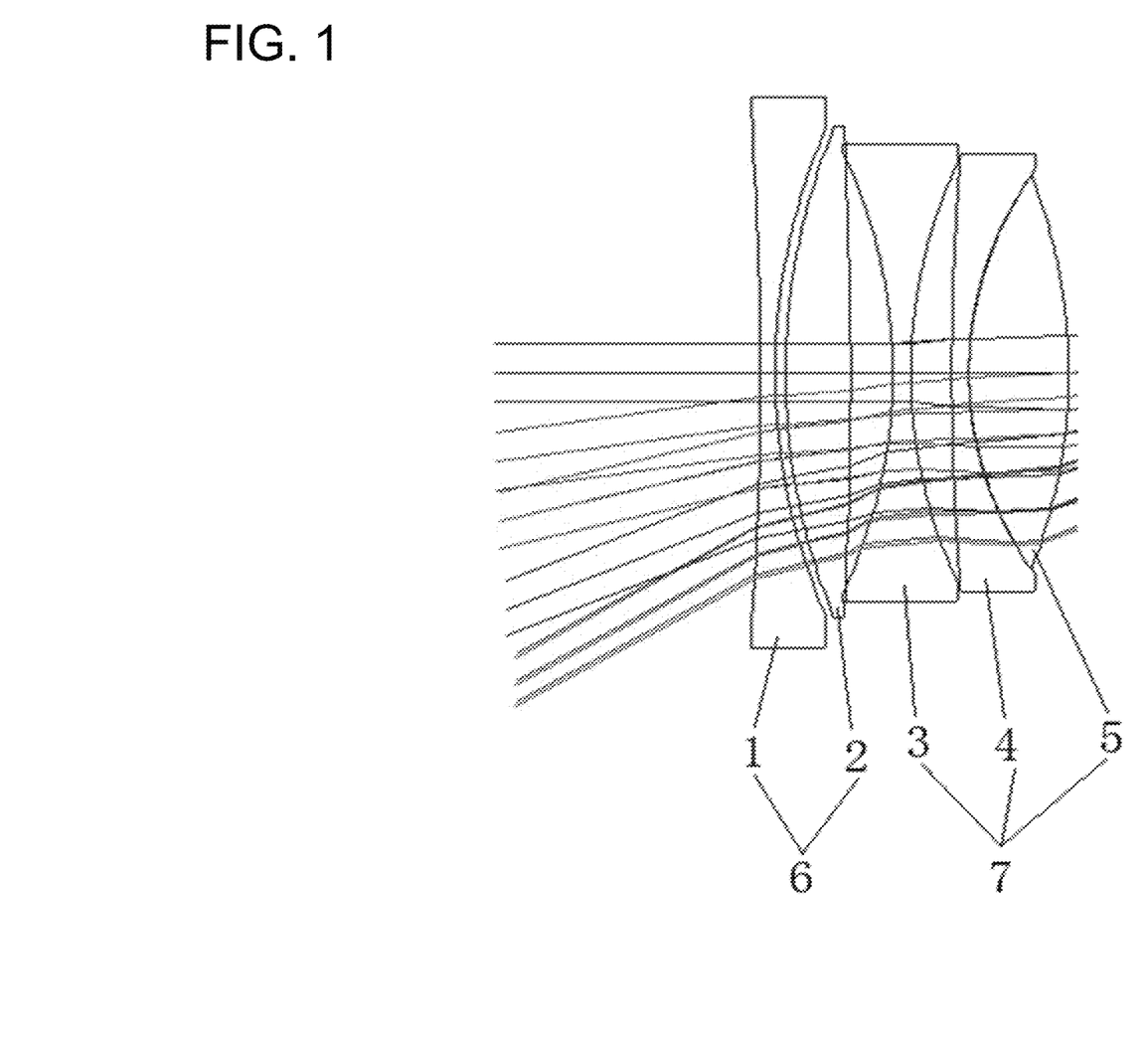
FIG. 1 is an optical structure diagram in the Y-axis direction when the first lens of the add-on anamorphic lens provided by embodiments of the invention is at an infinite object distance.
Figure 2:
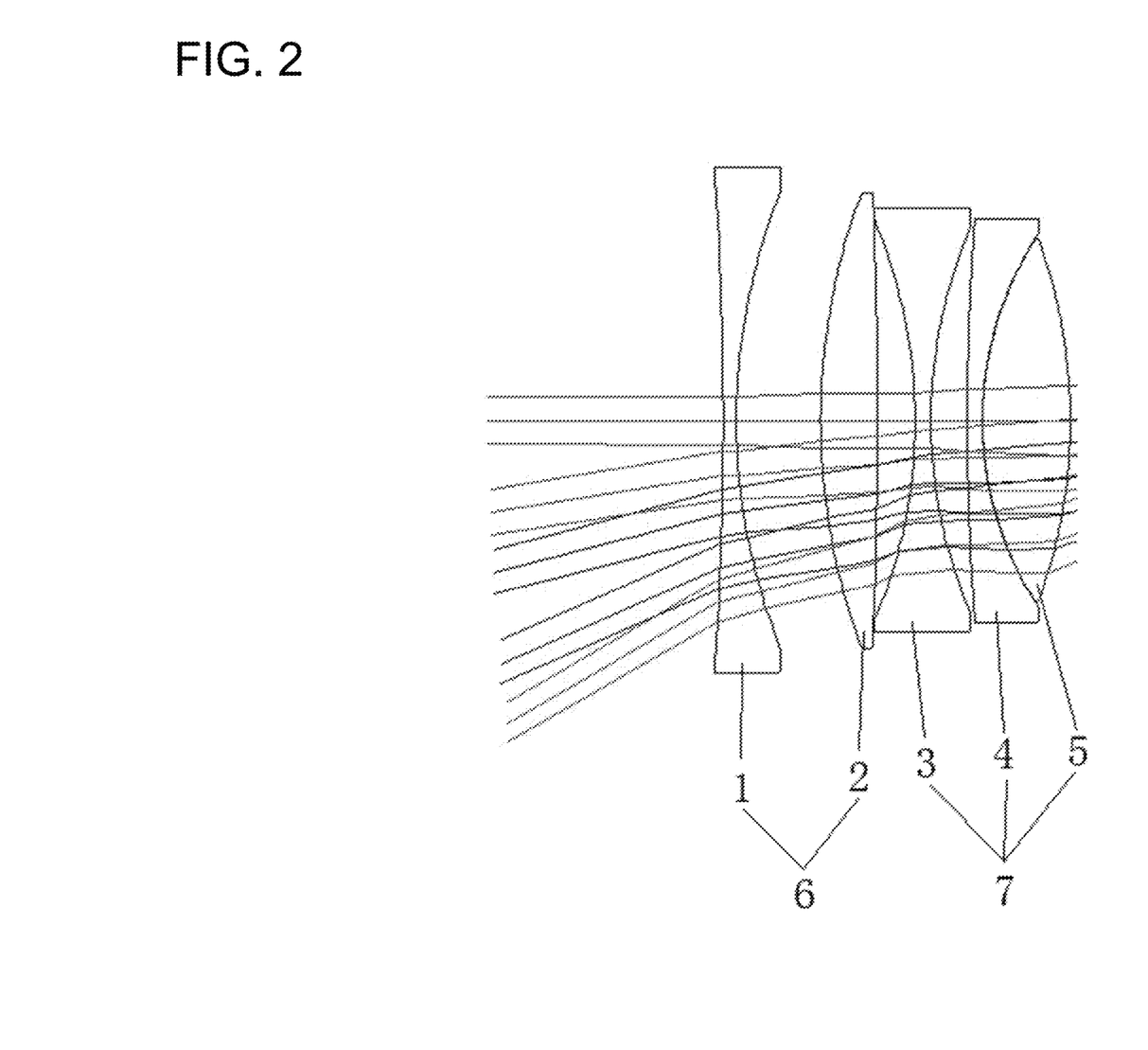
FIG. 2 is an optical structure diagram in the Y-axis direction when the first lens of the add-on anamorphic lens provided by embodiments of the invention is at the closest object distance.
Figure 3:
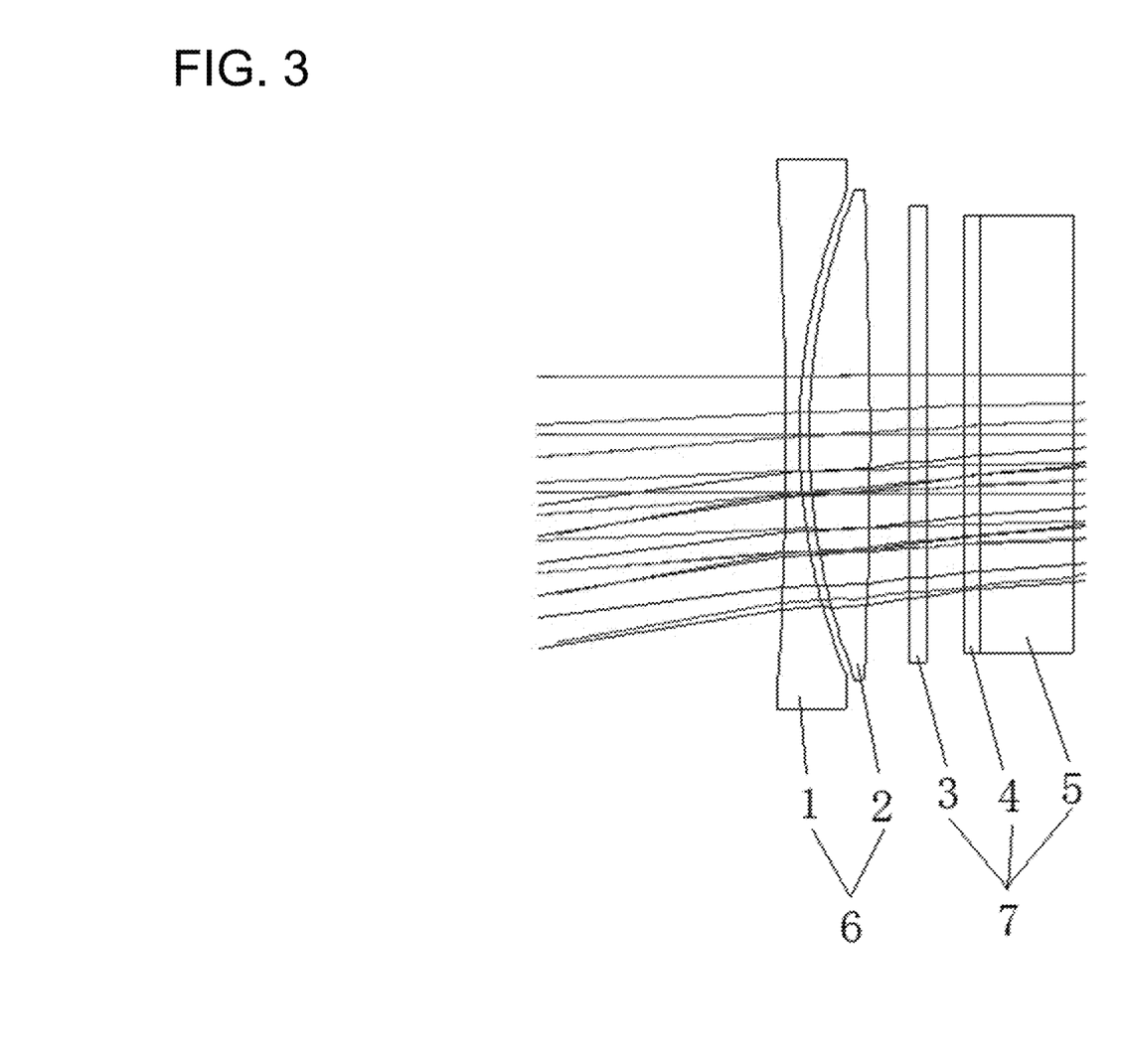
FIG. 3 is an optical structure diagram in the X-axis direction when the first lens of the add-on anamorphic lens provided by embodiments of the invention is at an infinite object distance.
Figure 4:
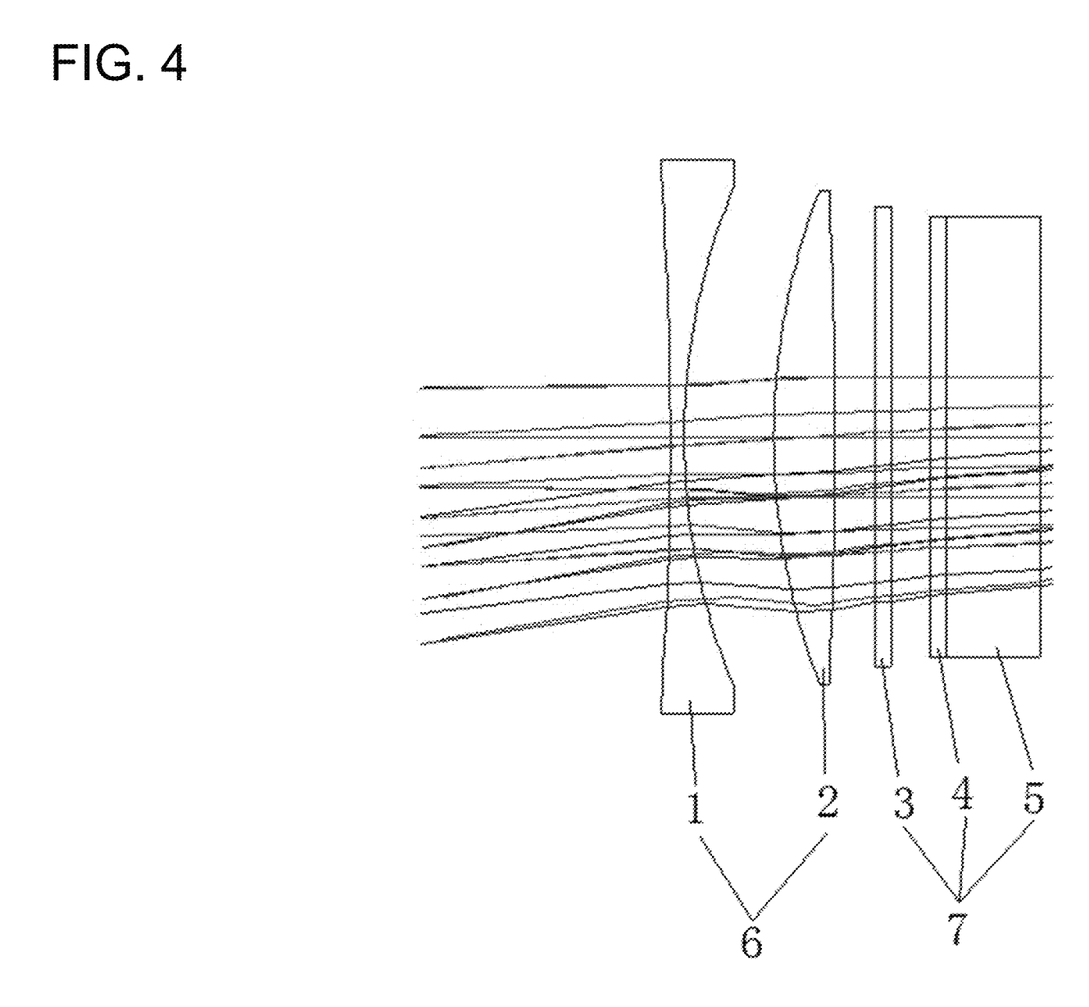
FIG. 4 is an optical structure diagram in the X-axis direction when the first lens of the add-on anamorphic lens provided by embodiments of the invention is at the closest object distance.
Figure 5:
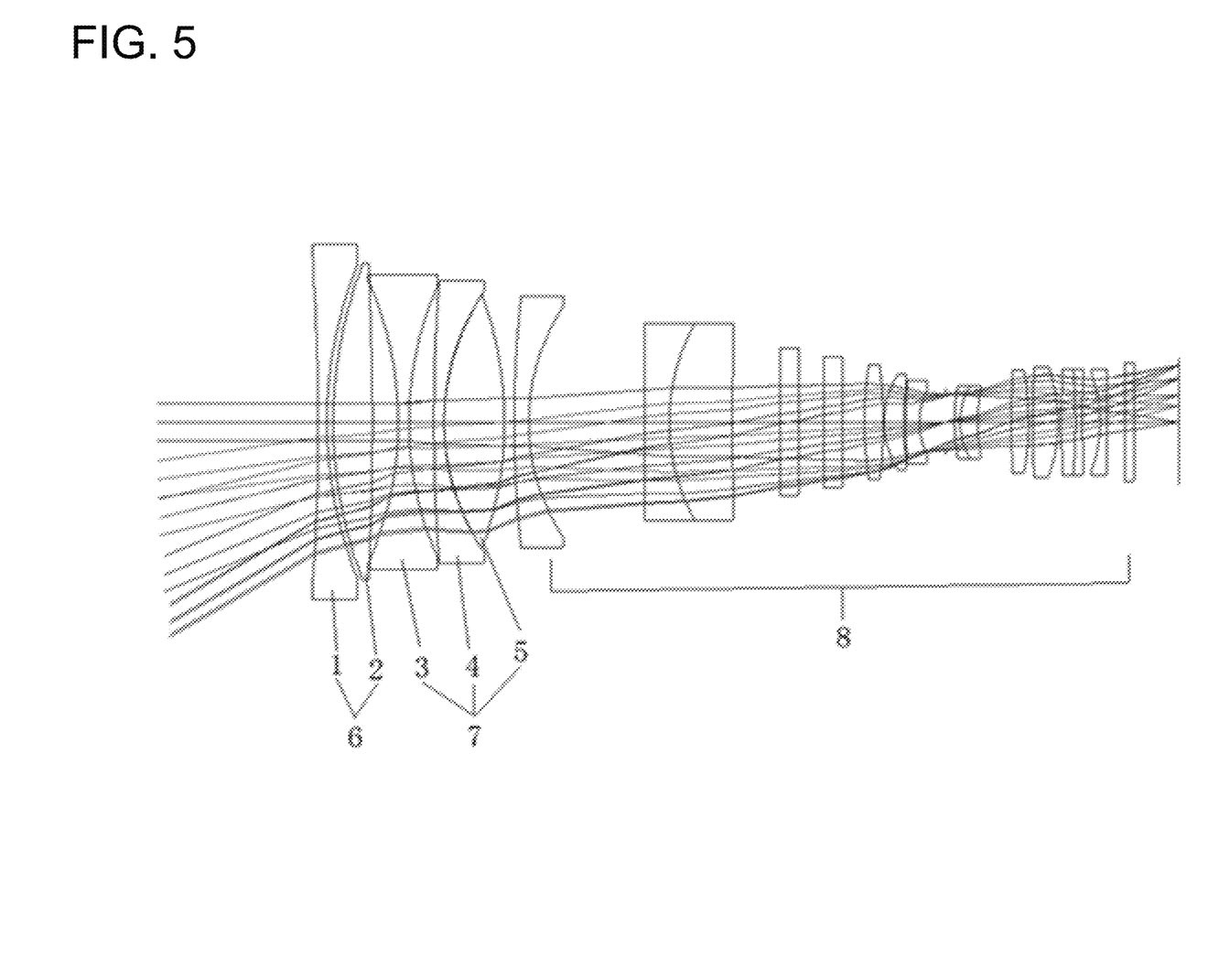
FIG. 5 is an optical structure diagram in the Y-axis direction when the add-on anamorphic lens provided by embodiments of the invention to a matching 1.60× anamorphic lens.
Figure 6:
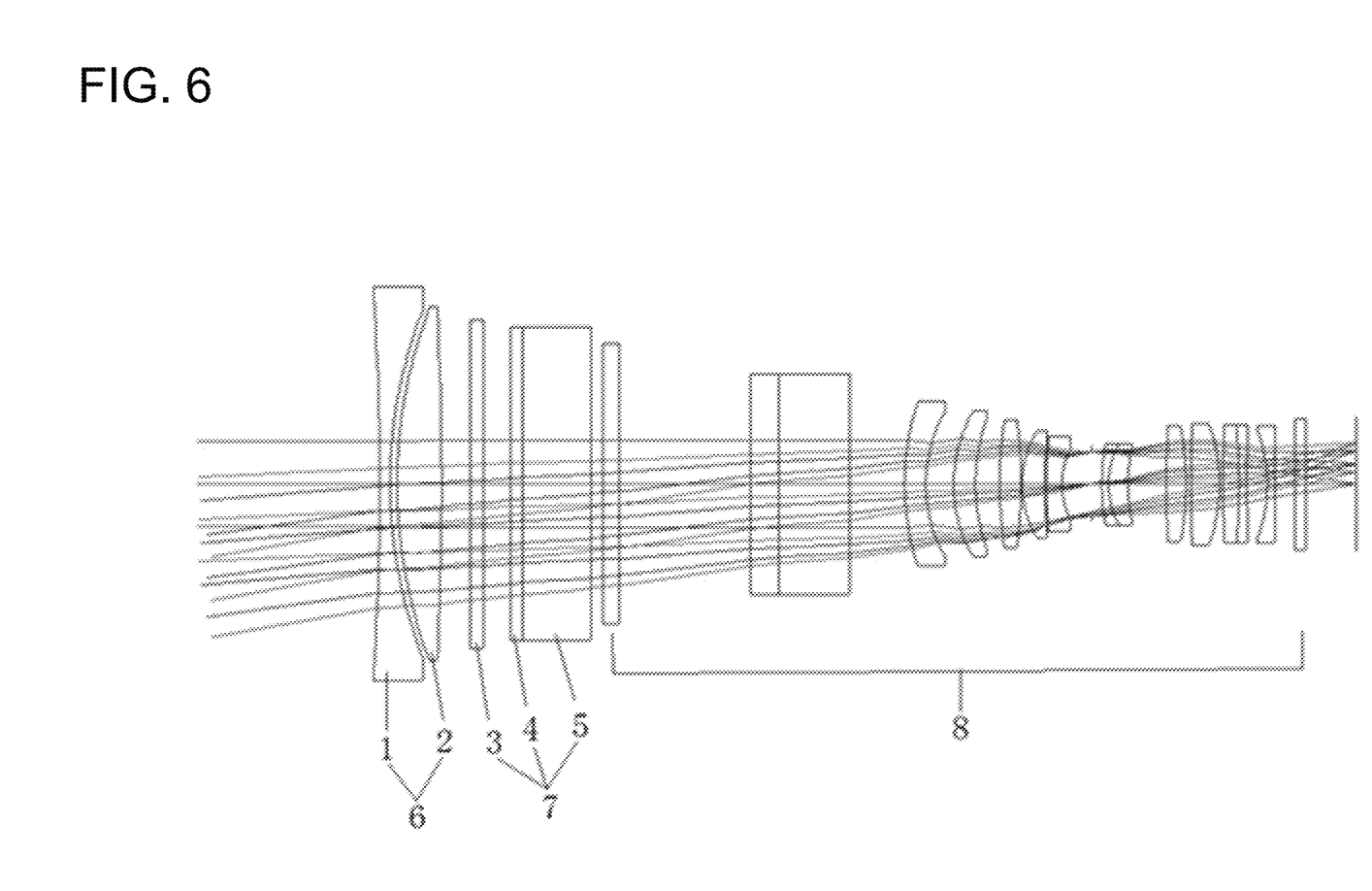
FIG. 6 is an optical structure diagram in the X-axis direction when the add-on anamorphic lens provided by embodiments of the invention to the matching 1.60× anamorphic lens.
Figure 7:
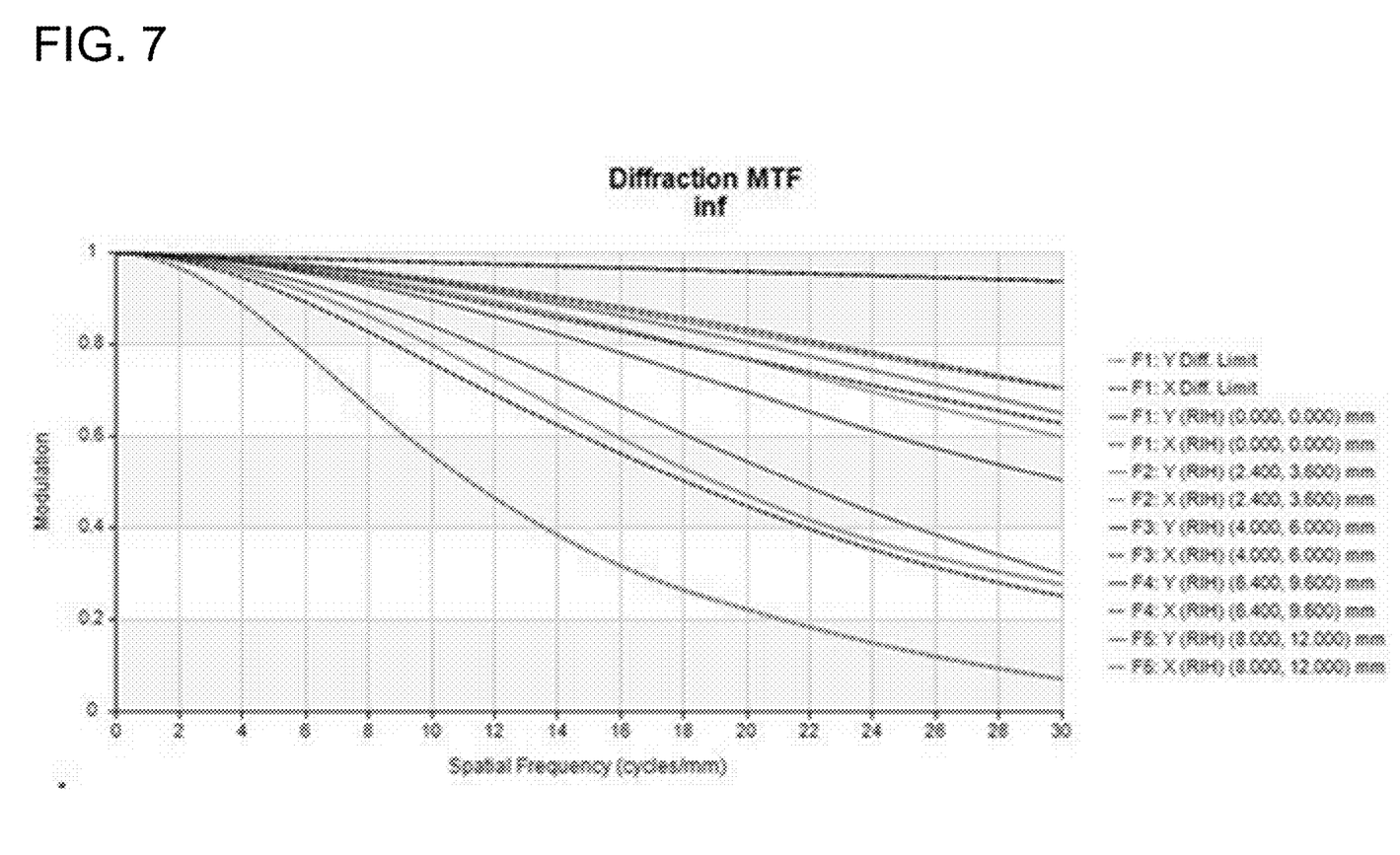
FIG. 7 is the transfer function body when the add-on anamorphic lens provided by embodiments of the invention is matched with the 1.60× anamorphic lens.

In one embodiment, the anamorphic magnification of the add-on anamorphic lens may be 1.25×, which may match to another anamorphic lens with a power of 1.60 times magnification to achieve a total 2.0× professional anamorphic magnification while maintaining excellent resolution performance. Referring to FIGS. 5-6, the anamorphic lens 8 may comprise multiple spherical lenses and cylindrical lenses. In one aspect, the optical axes of the anamorphic lens 8 and the add-on anamorphic lens may overlap or coincident to one another, and the add-on anamorphic lens may be located on the object side of the anamorphic lens 8.

When the above-mentioned add-on anamorphic lens is produced, the length of the add-on anamorphic lens itself may be less than 70 mm, and the filter matching size may be 82 mm.

It is to be understood that various materials may be used for manufacturing each lens without departing from scope or spirit of aspects of the invention. In this embodiment, each lens is made of an optical glass.

Obviously, the above-mentioned embodiments are only examples of the description, and are not intended to limit the implementation manner. For those of ordinary skilled in the art, changes or modifications in other different forms can also be made on the basis of the above description. There is no need and cannot be exhaustive of all implementations here. And the obvious changes or changes derived from this are still within the scope of protection created by the present application.

What is claimed is:

1. An external anamorphic lens comprising:
   a focus group and an anamorphic group disposed in sequence from an object side to an image side along an optical axis;
   wherein the focus group comprises a first lens and a second lens, wherein the first lens and the second lens comprise spherical lenses;
   wherein the anamorphic group comprises a third lens, a fourth lens, and a fifth lens, wherein the third lens, the fourth lens, and the fifth lens comprise cylindrical lenses;
   wherein a position of the first lens is adjustable along the optical axis; and
   a magnification of the focus group and the anamorphic group comprise 1.25 times and is adapted to be used with another anamorphic lens with a magnification of 1.60 times.

2. The external anamorphic lens of claim 1, further comprising a length of less than 70 mm.

3. The external anamorphic lens of claim 1, further comprising an add-on matching filter comprising a characteristic of 82 mm.

4. The external anamorphic lens of claim 1, wherein the fourth lens and the fifth lens are attached together.

5. An add-on anamorphic lens comprising:
   a focus group and an anamorphic group disposed in sequence from an object side to an image side along an optical axis;
   wherein the focus group comprises a first lens and a second lens, wherein the first lens and the second lens comprise spherical lenses;
   wherein the anamorphic group comprises a third lens, a fourth lens, and a fifth lens, wherein the third lens, the fourth lens, and the fifth lens comprise cylindrical lenses;
   wherein a position of the first lens is adjustable along the optical axis; and
   an add-on matching filter comprising a characteristic of 82 mm.

6. The add-on anamorphic lens of claim 5, further comprising of 1.25 times and is adapted to be used with another anamorphic lens with a magnification of 1.60 times.

7. The add-on anamorphic lens of claim 5, further comprising a length of less than 70 mm.

8. The add-on anamorphic lens of claim 5, wherein the fourth lens and the fifth lens are attached together.

* * * * *